(12) United States Patent
Schmidt et al.

(10) Patent No.: US 9,388,364 B1
(45) Date of Patent: Jul. 12, 2016

(54) LIQUEFACTION PROCESSES AND SYSTEMS AND LIQUEFACTION PROCESS INTERMEDIATE COMPOSITIONS

(71) Applicant: Battelle Memorial Institute, Richland, WA (US)

(72) Inventors: Andrew J. Schmidt, Richland, WA (US); Todd R. Hart, Kennewick, WA (US); Justin M. Billing, Richland, WA (US); Gary D. Maupin, Richland, WA (US); Richard T. Hallen, Richland, WA (US); Daniel B. Anderson, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 14/738,563

(22) Filed: Jun. 12, 2015

(51) Int. Cl.
*C11B 1/12* (2006.01)
*C11B 3/00* (2006.01)
*B01J 19/24* (2006.01)

(52) U.S. Cl.
CPC . *C11B 1/12* (2013.01); *B01J 19/24* (2013.01); *C11B 3/008* (2013.01); *B01J 2219/00051* (2013.01); *B01J 2219/24* (2013.01)

(58) Field of Classification Search
None
See application file for complete search history.

(56) References Cited

U.S. PATENT DOCUMENTS

| 4,442,006 | A | 4/1984 | Ishida et al. |
| 2005/0113611 | A1* | 5/2005 | Adams ................ C10G 1/045 585/240 |

| 2011/0167713 | A1 | 7/2011 | Quignard et al. |
| 2012/0055077 | A1 | 3/2012 | Savage et al. |
| 2013/0206571 | A1 | 8/2013 | Heilmann et al. |

FOREIGN PATENT DOCUMENTS

| CN | 102382683 | 3/2012 |
| WO | WO2011143380 | 11/2011 |

(Continued)

OTHER PUBLICATIONS

Elliott, D.C., et al., Hydrothermal liquefaction of biomass: Developments from batch to continuous process, Oct. 2014, Bioresource Technology, 178 (2015) pp. 147-156.*

(Continued)

*Primary Examiner* — Yate K Cutliff
(74) *Attorney, Agent, or Firm* — Wells St. John P.S.

(57) ABSTRACT

Liquefaction processes are provided that can include: providing a biomass slurry solution having a temperature of at least 300° C. at a pressure of at least 2000 psig; cooling the solution to a temperature of less than 150° C.; and depressurizing the solution to release carbon dioxide from the solution and form at least part of a bio-oil foam. Liquefaction processes are also provided that can include: filtering the biomass slurry to remove particulates; and cooling and depressurizing the filtered solution to form the bio-oil foam. Liquefaction systems are provided that can include: a heated biomass slurry reaction zone maintained above 300° C. and at least 2000 psig and in continuous fluid communication with a flash cooling/depressurization zone maintained below 150° C. and between about 125 psig and about atmospheric pressure. Liquefaction systems are also provided that can include a foam/liquid separation system. Liquefaction process intermediate compositions are provided that can include a bio-oil foam phase separated from an aqueous biomass solids solution.

11 Claims, 7 Drawing Sheets

(56) References Cited

FOREIGN PATENT DOCUMENTS

WO PCT/US2013/041214 10/2013
WO PCT/US2013/041214 12/2014

OTHER PUBLICATIONS

Or, C., et al., Numerical Simulation of CO2 gas microbubbles of foamy oil, 2014, Energy Procedia, vol. 63, pp. 7821-7829.*

Peterson, A.A, et al., Thermochemical biofuel production in hydrothermal media: a review of sup- and supercritical water technologies, 2008, Energy Enviorn. Sci., vol. 1, pp. 32-65.*

Elliott, D.C., "Chemical Processing in High-Pressure Aqueous Environments. 7. Process Development for Catalytic Gasification of Wet Biomess Feedstocks", Ind. Eng. Chem. Res. (2004), 43, pp. 1999-2004.

Elliott, D.C., et al., "Catalytic Hydrothermal Gasification of Lignin-Rich Biorefinery Residues and Algae", Final Report, Prepared for the U.S. Department of Energy under Contract DE-AC06-76RLO 1830, PNNL-18944, (2009).

Frank, E.D., et al. Life cycle comparison of hydrothermal liquefaction and lipid extraction pathways to renewable diesel from algae, Mitigation and Adaptation Strategies for Global Change, vol. 18, Issue 1, (2012), 137-158.

Haiduc, A.G., "SunCHem: an integrated process for the hydrothermal production of methane from microalgae and CO2 mitigation", J. Appl. Phycol. (2009), 21, pp. 529-541.

Toor, Saqib S., et al. "Hydrothermal liquefaction of biomass: A review of subcritical water technologies", Energy, 36 (2011), pp. 2328-2342.

Zhang, L., et al. Supercritical water gasification of an aqueous by-product from biomass hydrothermal liquefaction with novel Ru modified Ni catlaysts, Bioresource Technology, 102 (2011) 8279-8287.

* cited by examiner

LIQUEFACTION PROCESSES AND SYSTEMS AND LIQUEFACTION PROCESS INTERMEDIATE COMPOSITIONS

STATEMENT REGARDING RIGHTS TO INVENTION MADE UNDER FEDERALLY-SPONSORED RESEARCH AND DEVELOPMENT

This invention was made with Government support under Contract DE-ACO5-76RL01830 awarded by the U.S. Department of Energy. The Government has certain rights in the invention.

TECHNICAL FIELD

The present disclosure relates to liquefaction processes and systems as well as liquefaction process intermediate compositions. These systems and processes can be used in the form of hydrothermal liquefaction and they can be used to perform hydrothermal liquefaction on biomass solutions to create a bio-oil.

BACKGROUND

Bio-oils can be created from the hydrothermal liquefaction of a biomass slurry. These processes present many challenges for performing the process efficiently on many levels. One challenge is the pumping of biomass slurries through process systems, as well as the separation of the bio-oils from the reaction solutions. The present disclosure provides liquefaction process systems and intermediate compositions that overcome drawbacks of the prior art.

SUMMARY OF THE DISCLOSURE

Liquefaction processes are provided that can include: providing a biomass slurry solution having a temperature of at least 300° C. at a pressure of at least 2000 psig; cooling the solution to a temperature of less than 150° C.; and depressurizing the solution to release carbon dioxide from the solution and form at least part of a bio-oil foam.

Liquefaction processes are also provided that can include: filtering the biomass slurry to remove particulates; and cooling and depressurizing the filtered solution to form a bio-oil foam.

Liquefaction systems are provided that can include: a heated biomass slurry reaction zone maintained above 300° C. and at least 2000 psig and in continuous fluid communication with a flash cooling/depressurization zone maintained below 150° C. and about atmospheric pressure.

Liquefaction systems are also provided that can include a flash depressurization zone maintained between about 125 psig and about atmospheric pressure in fluid communication with foam/liquid separation system.

Liquefaction process intermediate compositions are provided that can include a bio-oil foam phase separated from an aqueous biomass solids solution.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
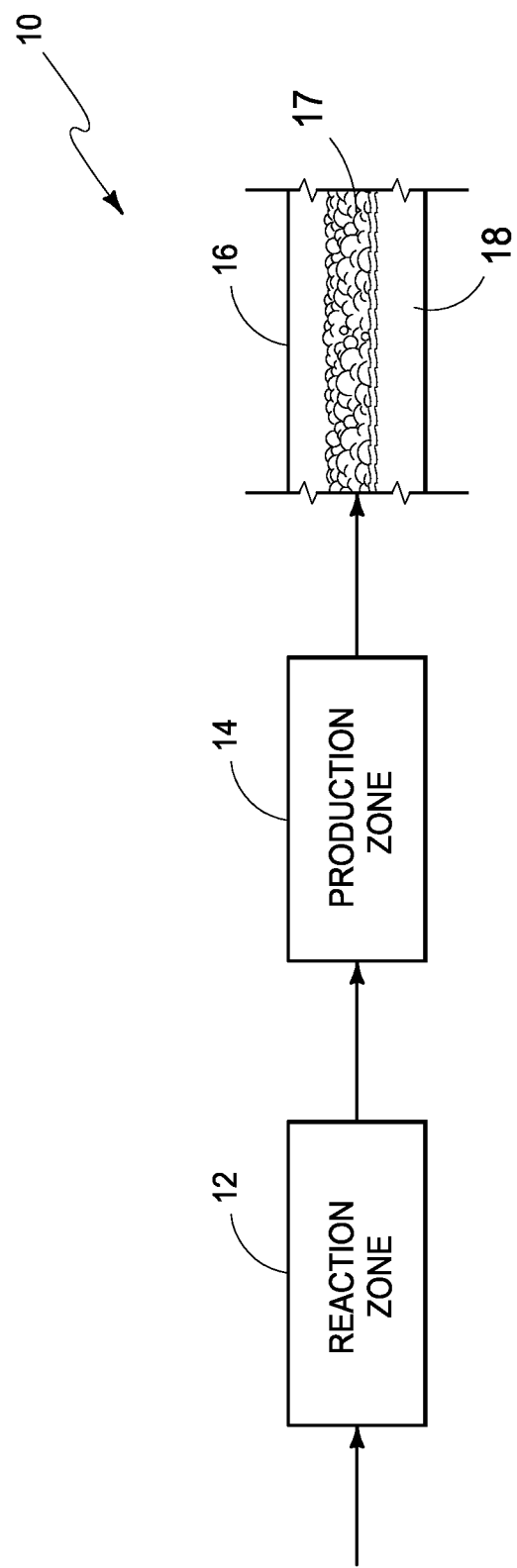
FIG. 1 is a depiction of a process system according to an embodiment.

The process systems and intermediate compositions of the present disclosure will be described with reference to FIGS. 1-7. Referring first to FIG. 1, a process system 10 is shown that includes a reaction zone 12 in fluid communication with a production zone 14, yielding a process intermediate 16. Entering the reaction zone 12 but not shown can be a biomass slurry solution. This biomass slurry solution can be provided to reaction zone 12, and this biomass slurry solution can include biomass and water, for example.

Biomass sources suitable for use in this solution include but are not limited to agricultural residues (e.g., corn stover), forest residue (e.g., pine), industrial/municipal sludges, aquatic biomass sources (e.g., algae, kelp), high moisture biomass slurries, biosludge from wastewater treatment systems, sewage sludge from municipal treatment systems, wet biproducts from biorefinary operations, wet byproducts and residues from food processing, animal waste and waste from centralized animal raising facilities, organic chemical manufacturing wastewater streams, other organic contaminated industrial wastewaters. These biomass materials may be derived from, for example, organic materials, plants, algae, macroalgae, microalgae, photosynthetic cyanobacteria, animal waste, food processing wastes including, e.g., trimmings, culls, pomace, cooking water, washings, fermentation residuals, meat solid wastes, dairy liquid wastes, wood and other biomass materials, raw materials such as fruits, vegetables, fish, poultry, livestock, and combinations of these raw materials and others sources and feedstock materials including combinations of these various sources. Biomass slurry solution can be substantially liquid and have density of from 0.95 mg/ml to about 1.15 mg/ml. Wood oils are examples of liquid biomass slurry solutions and this liquid biomass may have a density within the 0.95 to 1.15 range.

The biomass slurry solution can have a minimum wt % of about 8 wt/wt % and can range up to as high as 35 wt/wt % with the balance being water. The balance can also include saltwater and/or mixtures of water and inorganics. The slurry solutions can be maintained at this concentration to allow efficient pumping of these solutions in a continuous or steady state reaction system as disclosed herein.

This biomass slurry solution can be provided to reaction zone 12, and within reaction zone 12, the biomass slurry solution can be increased to a temperature of at least 300° C. and a pressure of at least 2000 psig. According to example implementations, reaction zone 12 can also be configured to maintain the slurry from about 300° C. to about 350° C. and a pressure of from about 2000 psig to about 3000 psig. The biomass slurry solution can be processed at a liquid hourly space velocity in zone 12 from about 1 to about 10 L/L/h From reaction zone 12, the reacted slurry solution can proceed to production zone 14. Production zone 14 can provide for the cooling, (which may be via heat exchange) of the reacted slurry solution to a temperature of less than 150° C. and/or the depressurizing of the solution to about atmospheric pressure. The reacted slurry solution can be cooled to below 110° C. as well. Upon depressurization, carbon dioxide can be released from the reacted slurry solution and form at least part of process intermediate 16 as a bio-oil foam. The bio-oil foam 17 that is formed resides above or is phase separated from the reacted aqueous solution 18 of the biomass slurry solution. The bio-oil foam composition 16 can be provided from production zone 14 as shown in FIG. 1.

Figure 2:
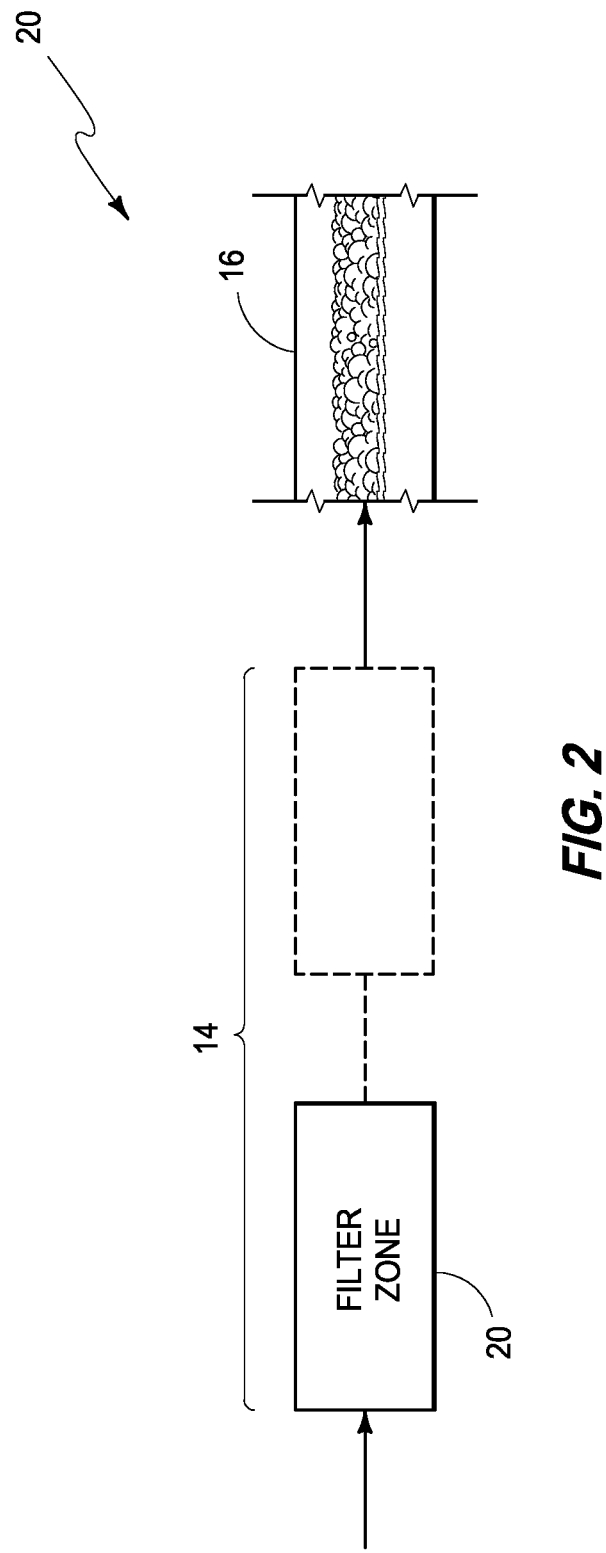
FIG. 2 is a depiction of a process system according to an embodiment.

Referring next to FIG. 2, production zone 14 may have a subzone such as filter zone 20 as shown in system 20 of FIG. 2. Filter zone 20 can be configured to receive heated and pressurized biomass slurry solution from reactant zone 12 for example and filter same. According to one embodiment of the disclosure, the slurry solution at temperatures between 300° C. and 350° C. and pressures between 2000 psig and 3000 psig can be filtered to remove solids and particulates. This filtering can minimize the formation of emulsions during the preparation of intermediate composition 16. The filter device can include a high crush rating or strength such as a stainless steel filter device. The device can have a filter breakthrough rating selected in the range between about 0.5% to about 2%. Example devices can have an internal filter with selected pore sizes including, e.g., 5 um pores rated to remove up to 98% of solids such as organic or inorganic solids including organic char. In alternative embodiments, filter zone 20 can include an internal filter with 18 μm pores configured to remove up to 100% of inorganic solids and precipitates from the solution that is passed from the reaction zone. Filtration zone 20 may include a top-down filter zone and may also include a woven filter design.

Figure 3:
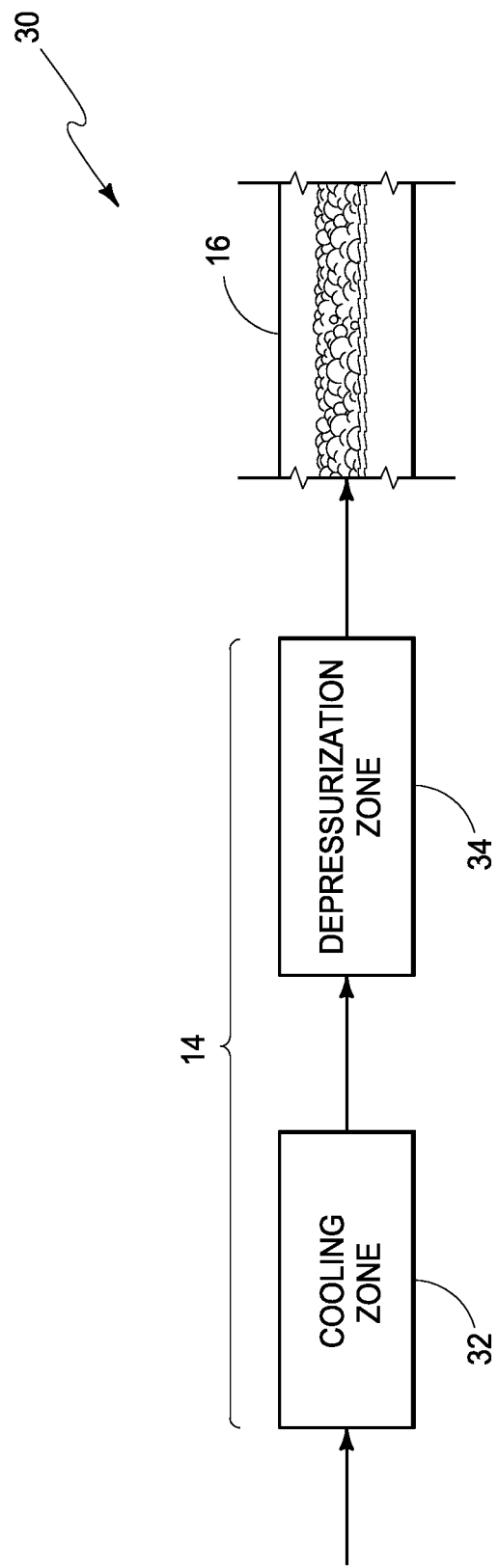
FIG. 3 is a depiction of a process system according to an embodiment.

Referring next to FIG. 3, process system 30 can include as part of the production zone 14 as depicted in system 30, cooling zone 32 in fluid communication with depressurization zone 34 to yield product intermediate 16. As shown in FIG. 3, cooling zone 32 can include a zone that is configured to receive reacted biomass slurry at a temperature above 300° C. and reduce the temperature of that solution to below 150° C. or 110° C. in some embodiments, and in other embodiments, to a temperature of from between about 20° C. and 110° C. In certain specific implementations, the temperature can be reduced to 60° C. to 70° C. as well, for example.

Cooling zone 32 can be in fluid communication with, for example, filter zone 20 of FIG. 2 as part of production zone 14, for example. Cooling zone 32 can be in fluid communication with a depressurization zone 34 wherein upon cooling, the pressure applied to the solution is rapidly changed from at least 2000 psig to less than 125 psig to about atmospheric pressure. According to some implementations, during this rapid depressurization, exsolvation of saturated $CO_2$ formed as a product in the reaction zone evolves and brings with it bio-oils from the aqueous solution to form a bio-oil foam or froth. The terms "bio-oil froth" and "bio-oil foam" are used interchangeably herein.

It has been discovered that this bio-oil foam or froth resides above the aqueous solution at atmospheric pressure and provides intermediate composition 16 that can be exploited to separate the foam from the liquid solution, and thereby acquire the bio-oil produced during the reaction phase. This foam can be separated from the solution in a separation zone that can be coupled in fluid communication to the production zone.

Figure 4:
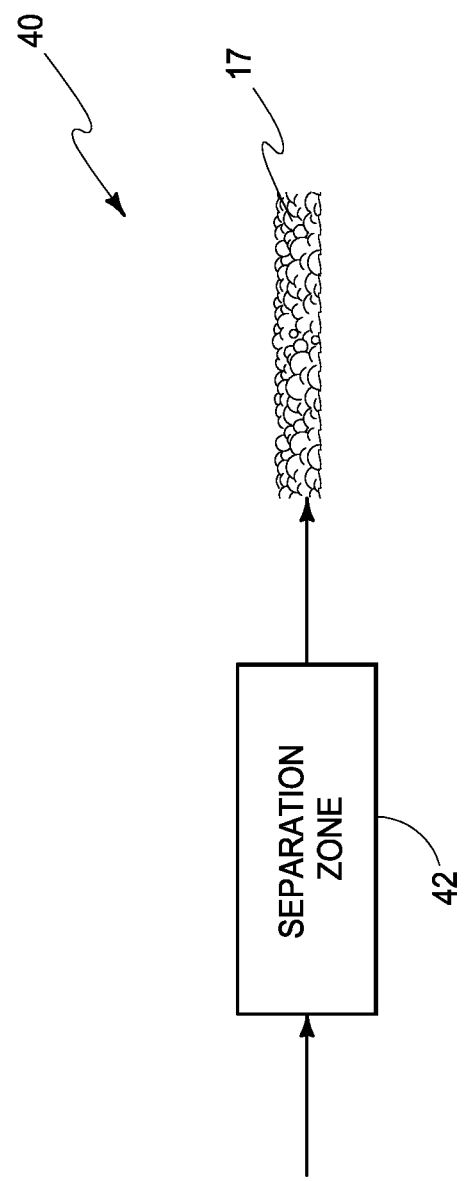
FIG. 4 is a depiction of a process system according to an embodiment.

Referring to FIG. 4, according to another embodiment, a process system 40 can include a separation zone 42 down the process from production of the intermediate process composition 16, and this separation zone can be in fluid communication, for example, with production zone 14. Separation zone 42 for example of process system 40 can be utilized to separate the bio-oil foam from the aqueous solution upon which it resides. This separation can yield a bio-oil foam which can be collapsed later to form a liquid bio-oil. Separation zone 42 can include, for example, a configuration of weirs, condensers and/or traps that can be utilized to separate the foam from the liquid. According to example implementations, the separation zone can include at least two float traps, and in fluid communication with each of the two float traps can be a condenser, for example.

Figure 5:
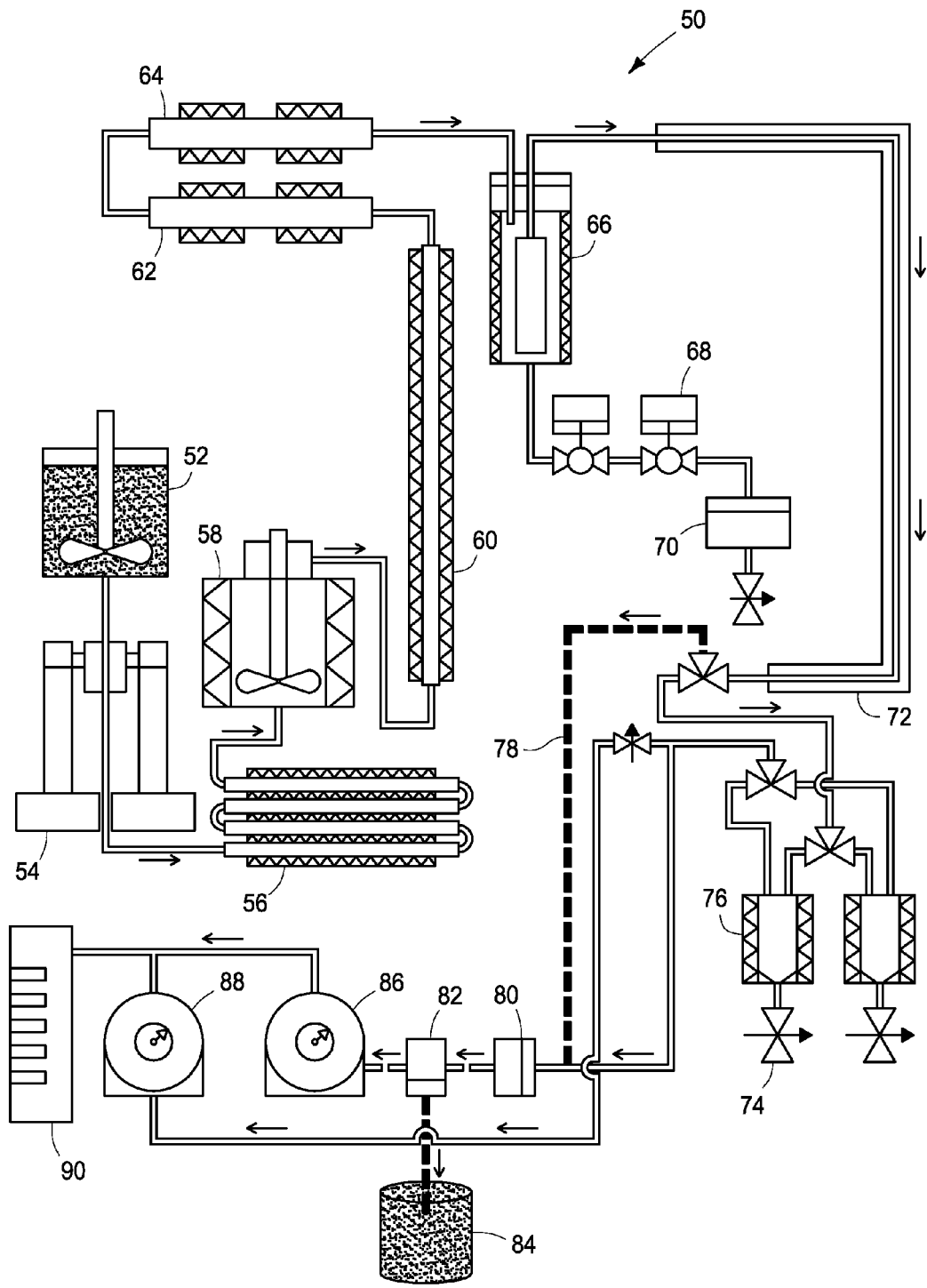
FIG. 5 is a depiction of a process system according to an embodiment.

Referring next to FIG. 5, a more detailed process system is shown according to an embodiment of the disclosure, and this system 50 can include a feed tank and stirrer 52 which can be configured to receive the biomass slurry solution and coupled directly to this feed tank and stirrer can be syringe pumps 54, for example, which are coupled to horizontal oil jacketed preheaters 56 which can be maintained at about 160° C. Horizontal oil jacketed preheaters 56 can have an interior diameter of about ½" and can have a volume of about 210 ml. Coupled to these heaters can be a stir tank reactor 58 that can be heated with electric heat, and then coupled to a tubular reactor 60 which can be a vertical oil jacketed tubular reactor maintained at about 350° C. This reactor can have an inner diameter of about ½" and a volume of about 127 ml. In fluid communication with the reactor 60 can be reaction zone 1 as item 62. This can be a resistance heated zone and can be maintained at 350° C. and have a ½" interior diameter and have a volume of 60 ml. In fluid communication with this zone can be resistance heated zone 2 as item 64, which can also be a zone having a ½" diameter and an 80 ml volume. The reactors 60, 62 and 64 can form the herein described reaction zone, for example.

In fluid communication with reactor 64 can be an oil jacketed filter system 66 than can have an interior volume of about 670 ml. One side of this filter can be mixture and blow out pot assemblies 68 and 70. In fluid communication with the filter can be a heat exchanger outlet 72 which can be maintained at about 60° C. to 70° C. as described in this particular embodiment, but as indicated herein can be maintained at less than 150° C., or 110° C. or between 20° C. and 100° C.

In direct fluid communication with this heat exchanger outlet can be a bypass direct pressure let down conduit 78 which provides the reacted, filtered, and cooled solution to a separation zone. This bypass system 78 can bypass oil jacketed liquid collectors 76 with valve system 74, for example. Upon providing the cooled reacted solution to a separation zone which can include elements 80-88, the foam from the formed foam intermediate process composition can be separated utilizing a system that includes a back pressure regulator 80 that can be maintained at about 20° C. as well as a float trap 82 which can be in fluid communication with a container 84 configured to receive overfill from float trap 82. In fluid communication with float trap 82 can be sample collection assemblies 86 and 88, for example, which are also coupled to exhaust system 90.

Figure 6:
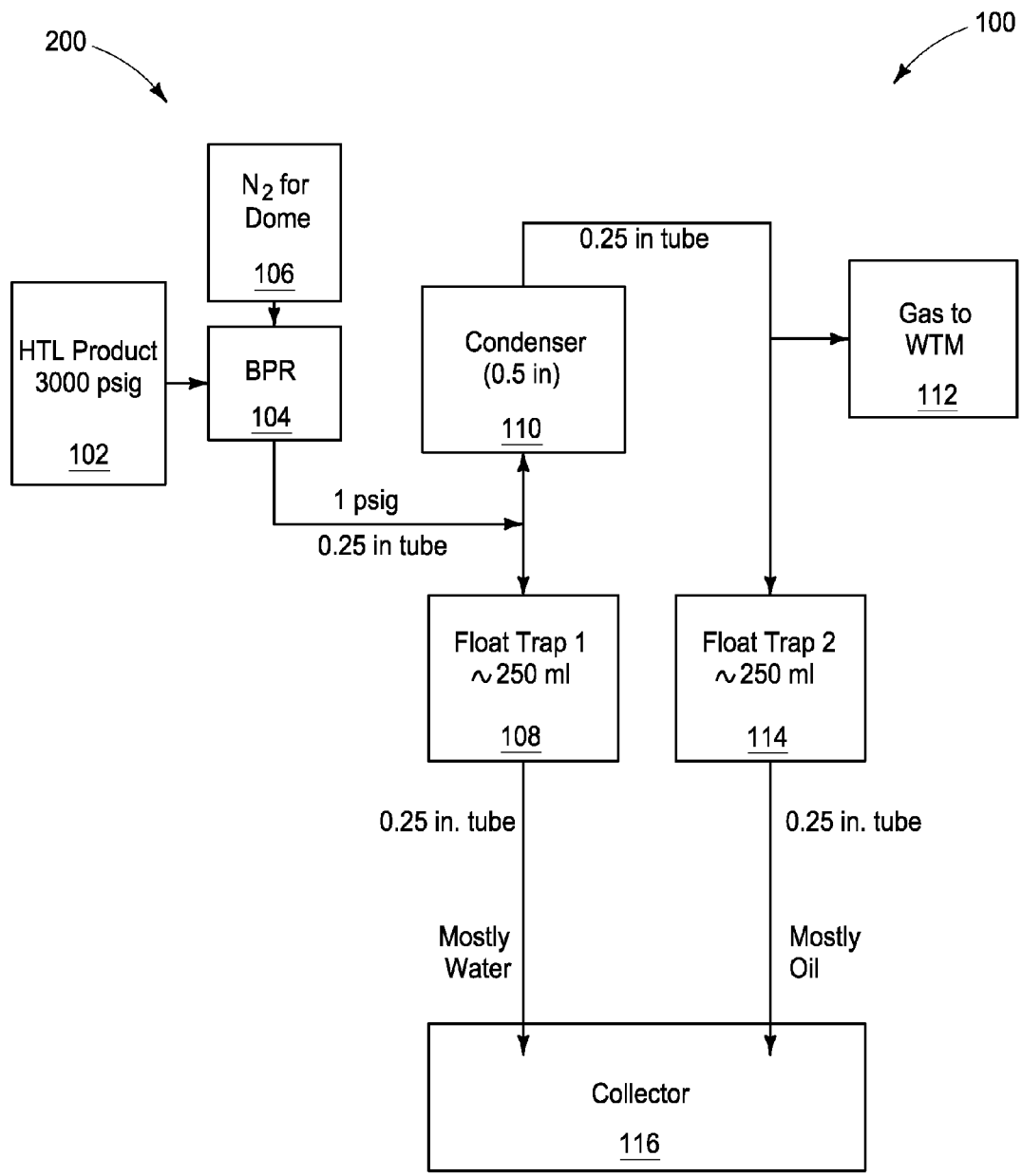
FIG. 6 is a depiction of a process system according to an embodiment.

Referring next to FIG. 6, a more detailed view of an example separation zone 100 is shown and in this separation zone, heated and reacted solution 102 can be rapidly cooled and then depressurized at section 104 after passing through a dome-loaded backpressure regulator 106 to produce the intermediate composition described herein. This intermediate composition can then be provided to an assembly that includes a condenser 110 in fluid communication with a float trap 108. Gaseous exhaust from condenser 110 can be provided to a gas recovery system 112 as well as a second float trap 114. Yields from float traps 108 and 114 can be provided to collector 116, for example.

Figure 7:
FIG. 7 is a depiction of an intermediate composition according to an embodiment of the disclosure.

As shown in FIG. 7, an example depiction of the intermediate foam bio-oil is shown wherein the foam bio-oil resides above the processed solution. This intermediate solution heretofore has not been known. Utilizing the process systems of the present disclosure, mass yield to bio-oil can range from about 25 to 40 wt % on a dry ash-free biomass basis. As one example, a 20 wt % slurry solution with a mass yield of 35 wt % can produce a process product stream that is 7 wt % bio-oil with the balance being aqueous phase.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A liquefaction process comprising:
providing a biomass slurry solution having a temperature of at least 300° C. at a pressure of at least 2000 psig;
cooling the solution to a temperature of less than 150° C.; and
depressurizing the solution to release carbon dioxide from the solution and form at least part of a bio-oil foam.

2. The liquefaction process of claim 1 further comprising separating the bio-oil foam from an aqueous solution.

3. The liquefaction process of claim 2 further comprising collapsing the bio-oil foam to a liquid.

4. The liquefaction process of claim 1 wherein the temperature of the biomass slurry is from about 300° C. to about 350° C.

5. The liquefaction process of claim 1 wherein the pressure applied to the biomass slurry solution is from about 2000 psig to about 3000 psig.

6. The liquefaction process of claim 1 wherein the solution is cooled to a temperature from about 20° C. to about 110° C.

7. A liquefaction process comprising:
providing a biomass slurry solution having a temperature of at least 300° C. at a pressure of at least 2000 psig;
filtering the slurry to remove particulates; and
cooling and depressurizing the filtered solution to release carbon dioxide from the solution and form at least part of a bio-oil foam.

8. The liquefaction process of claim 7 wherein the filtered solution is cooled to at least 150° C.

9. The liquefaction process of claim 7 wherein the filtered solution is depressurized to about atmospheric pressure.

10. The liquefaction process of claim 7 further comprising recovering the bio-oil foam and collapsing the foam to a liquid.

11. The liquefaction process of claim 10 wherein the recovering the bio-oil foam comprises removing the foam from an aqueous solution.

* * * * *